United States Patent [19]

Shimada et al.

[11] Patent Number: 6,018,937
[45] Date of Patent: Feb. 1, 2000

[54] LAWN MAINTENANCE APPARATUS HAVING A ROTATABLE, KEY OPERATED SWITCH

[75] Inventors: Kenzo Shimada; Tsutomu Inui; Norikazu Shimizu; Joji Maeda, all of Wako, Japan

[73] Assignee: Honda Giken Kogyo Kabushiki Kaisha, Tokyo, Japan

[21] Appl. No.: 09/006,185

[22] Filed: Jan. 13, 1998

[30] Foreign Application Priority Data

Jan. 14, 1997 [JP] Japan .................................. 9-005098

[51] Int. Cl.⁷ .................................................. A01D 34/82
[52] U.S. Cl. .............................................. 56/10.5; 56/16.7
[58] Field of Search ...................... 56/11.9, 10.8, 56/16.7, 12.1, 1, DIG. 9, 10.5, 17.5; 320/134, 107

[56] References Cited

U.S. PATENT DOCUMENTS

| | | | |
|---|---|---|---|
| 3,696,593 | 10/1972 | Thorud et al. | 56/17.5 |
| 3,982,082 | 9/1976 | Thorud et al. | 56/16.7 X |
| 5,085,043 | 2/1992 | Hess et al. | 56/10.5 |
| 5,301,494 | 4/1994 | Peot et al. . | |
| 5,819,513 | 10/1998 | Braun et al. | 56/11.9 |

FOREIGN PATENT DOCUMENTS

4-229515  8/1992  Japan .

*Primary Examiner*—Robert E. Pezzuto
*Attorney, Agent, or Firm*—Nikaido, Marmelstein, Murray & Oram LLP

[57] ABSTRACT

An electric working machine having an electric motor and batteries for providing power to the motor is provided. Power for charging the batteries is provided to the working machine through a connector. A key member is provided which comprises a key body having one end for insertion into and removal from a switch, and an operation portion which is integrally or removably provided at the other end of the key body extending sideways from the key body. The connector is positioned to the side of the switch at a location where it is covered by the operating portion of the key member at a turned position of the key member when the switch is in a first state, such that the connection of the connector with an external power source is made impossible. Such arrangement ensures that a simple structure having a substantially reduced number of parts is used, to supply the electric power to the electric motor and it is impossible to charge the batteries when the switch is in one state, and it is impossible to supply the electric power to the electric motor and it is possible to charge the batteries when the switch is in another state. The switch can be switched from one state to the other state by a simple operation.

6 Claims, 13 Drawing Sheets

LAWN MAINTENANCE APPARATUS HAVING A ROTATABLE, KEY OPERATED SWITCH

BACKGROUND OF THE INVENTION

1. Field of the Invention

The present invention relates to an electric working machine, such as an electric lawn mower, and particularly, to an improvement in an interlock system in an electric working machine including a switch capable of being switched between a first state in which it is possible to supply electric power from a battery to an electric motor and a second state in which it is impossible to supply the electric power from the battery to the electric motor. A key member is capable of being inserted into the switch only in the second state, to switch the switch, and a connector is provided for connecting an external power source for charging the battery. The improvement is that when the switch is in the state in which it permits the supplying of the electric power from the battery to the electric motor, the charging of the battery is impossible.

2. Description of the Prior Art

An interlock system in an electric working machine is already known, for example, from Japanese Patent Application Laid-Open No. 4-229515 and U.S. Pat. No. 5,301,494 and the like.

In the interlock system in the above Japanese Patent Application Laid-Open No. 4-229515, however, the switch is brought into the first state by insertion of the key member, so that the connector is covered with the key member, thereby making the charging of the battery from the external power source impossible. By removing the key member, the switch is brought into the second state, and it is possible to connect the external power source to the connector. Therefore, the interlock system is a complicated structure, and the insertion and removal of the key member is required to switch the switch. This results in a troublesome switching operation. In the interlock system in the U.S. Pat. No. 5,301,494, a slide plate is required which is movable between a position in which it is possible to connect the external power source to the connector, and it is impossible to insert the key member into the switch, and a position in which it is impossible to connect the external power source to the connector, and it is possible to insert the key member into the switch. This results in an increased number of parts.

SUMMARY OF THE INVENTION

Accordingly, it is an object of the present invention to provide an electric working machine having a simple structure with a significantly reduced number of parts, and designed so that the state in which it is possible to supply the electric power to the electric motor and impossible to charge the battery and the state in which it is impossible to supply the electric power to the electric motor and possible to charge the battery, can be switched from one to the other by a simple operation.

To achieve the above object, according to the present invention, there is provided an electric working machine comprising an electric motor for driving an operating member, batteries for supplying electric power to the electric motor, a switch for switching between a first state in which it is possible to supply electric power from the batteries to the electric motor and a second state in which it is impossible to supply electric power from the batteries to the electric motor, a key member capable of being inserted into and removed from the switch only in the second state to switch the switch, and a connector for connection to an external power source for charging the batteries. The key member is comprised of a key body having one end for insertion and removal from the switch, and an operation portion which is integral with or removably provided at the other end of the key body, to extend sideways from the key body. The connector is disposed to the side of the switch at a location at which it is covered with the operating portion of the key member at a turned position of the key member when the switch is in the first state, whereby the connection of the connector with the external power source is not possible.

With such arrangement, when the key member is inserted into the switch and is turned to bring the switch into the first state, connection of the external power source to the connector is made impossible by the connector being covered with the operating portion of the key member. When the key member is turned to switch the switch from the first state to the second state, the connection of the external power source to the connector is possible. Therefore, in a simple structure which does not require parts or components other than the switch, the key member and the connector, the state in which it is possible to supply the electric power to the electric motor and it is impossible to charge the batteries and the state in which it is impossible to supply the electric power to the electric motor and it is possible to charge the batteries, can be switched from one to the other by a simple operation with the key member not being withdrawn from the switch.

The above and other objects, features and advantages of the invention will become apparent from the following description of the preferred embodiment taken in conjunction with the accompanying drawings.

BRIEF DESCRIPTION OF THE DRAWINGS

FIGS. 1 to 13 illustrate an embodiment of the present invention.

DETAILED DESCRIPTION OF THE PREFERRED EMBODIMENTS

Figure 1:
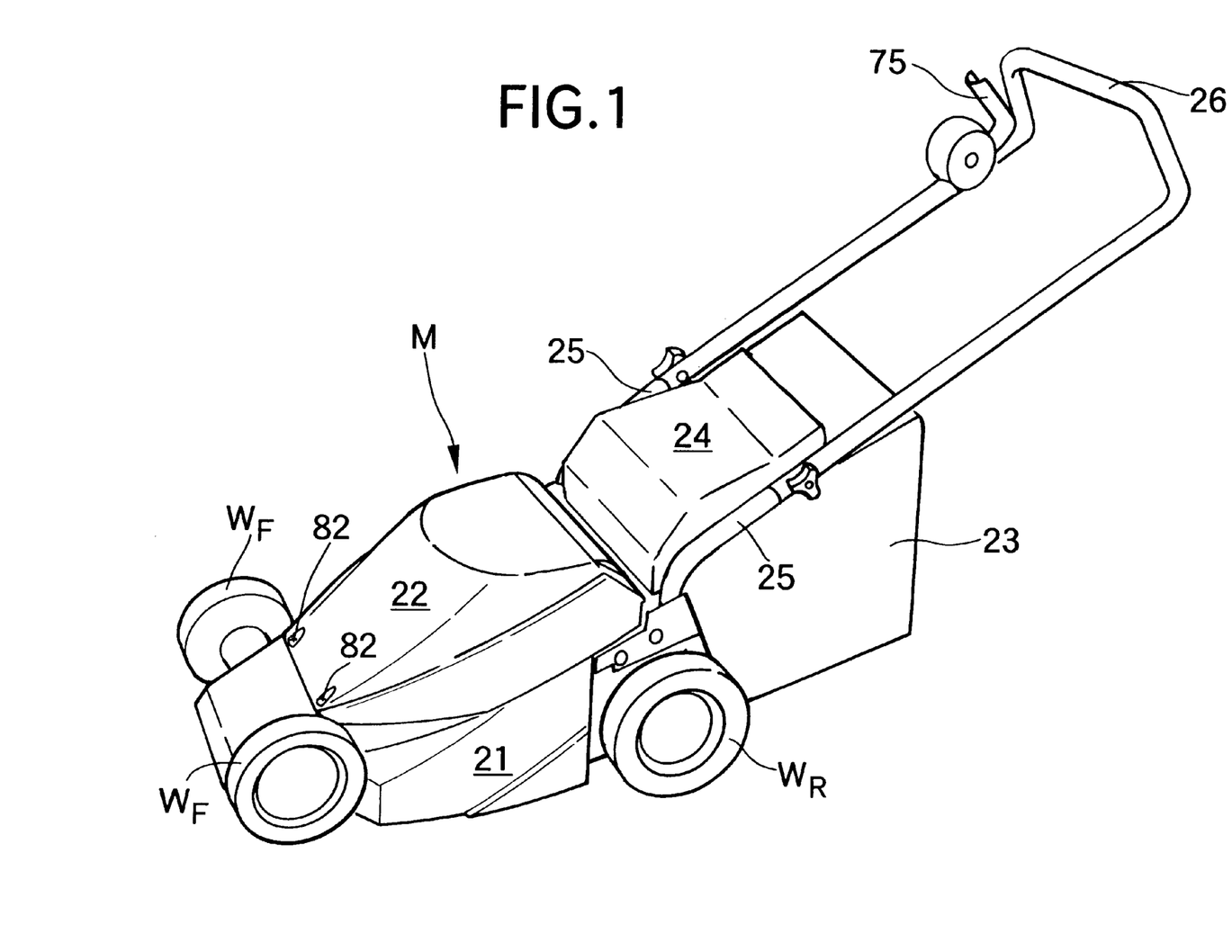
FIG. 1 is a side view of an entire electric lawn mower.
Figure 2:
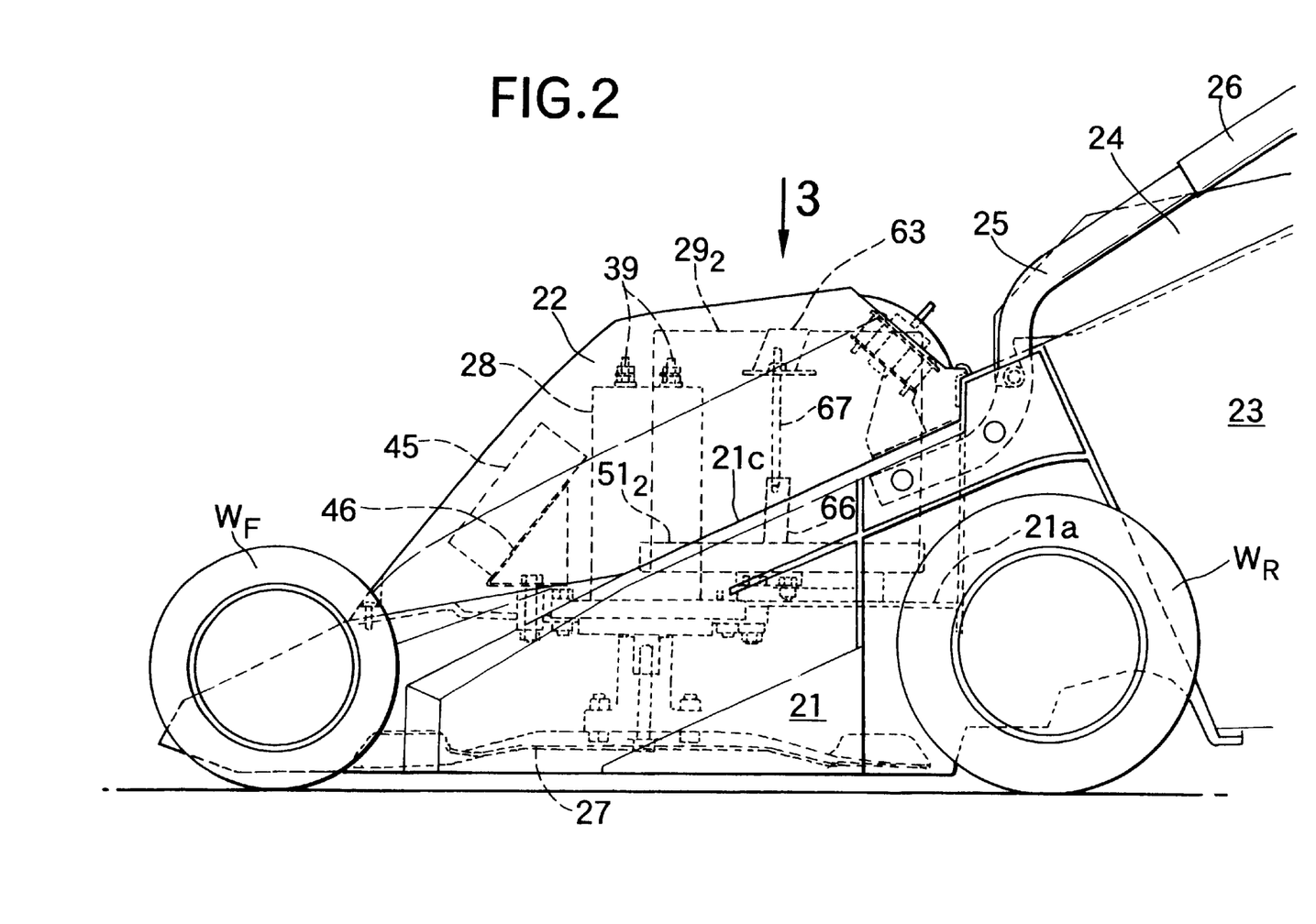
FIG. 2 is an enlarged side view of an essential portion of the electric lawn mower shown in FIG. 1.
Figure 3:
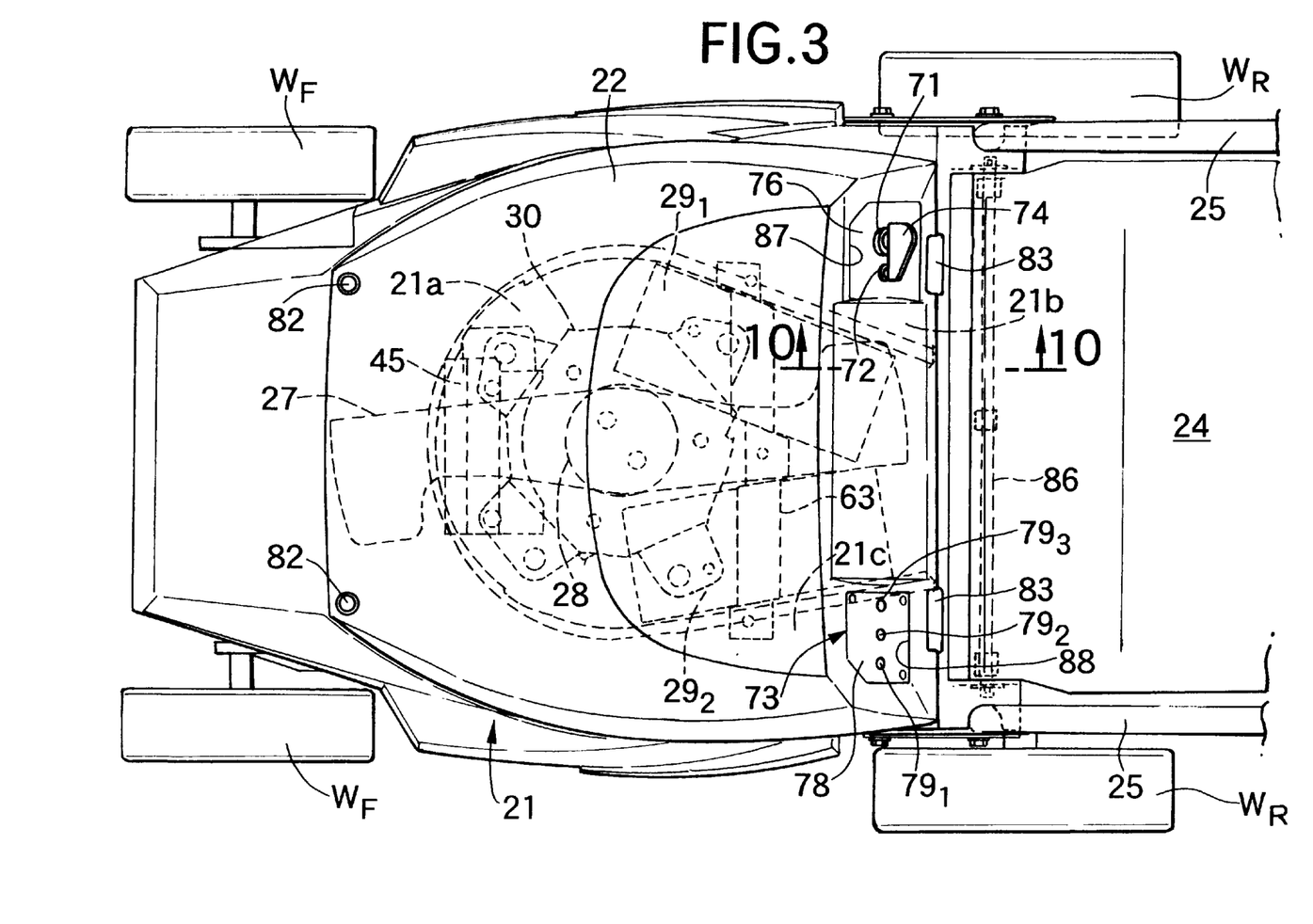
FIG. 3 is a plan view taken in the direction of arrow 3 in FIG. 2.

The present invention will now be described by way of an embodiment with reference to FIGS. 1 to 13. Referring first to FIGS. 1 to 3, an electric lawn mower M includes a cutter housing 21 also serving as a vehicle frame. A pair of left and right front wheels $W_F$, $W_F$ are mounted at a front portion of the cutter housing 21, and a pair of left and right rear wheels $W_R$, $W_R$ are mounted at a rear portion of the cutter housing 21. Moreover, the front wheels $W_F$, $W_F$ and the rear wheels $W_R$, $W_R$ are swingable about a horizontal axis, so that a clearance between a ground surface and the cutter housing 21 can be regulated by locking the swing positions of the front wheels $W_F$, $W_F$ and the rear wheels $W_R$, $W_R$ by a locking means (not shown).

An upper portion of the cutter housing 21 is covered with a bowl-like housing cover 22, and a grass bag 23 for accommodation of the cut grass is detachably mounted at a rear end of the cutter housing 21. Further, a discharge port cover 24 is swingably in upward and downward direction connected to an upper portion of a rear end of the cutter housing 21. When the grass bag 23 has been mounted at the rear end of the cutter housing 21, the discharge port cover 24 is turnable upwards in a manner such that it is retained on the grass bag 23.

Handlebar stays 25, 25 are secured to left and right opposite sides of the rear end of the cutter housing 21, and a handlebar 26 for pushing the electric lawn mower M for traveling movement, is connected to the handlebar stays 25, 25.

A cutter 27 is rotatably accommodated within the cutter housing 21, and an electric motor 28 for providing rotational power to the cutter 27 and a pair of batteries $29_1$ and $29_2$ for supplying an electric power to the electric motor 28, are mounted on the cutter housing 21.

Figure 4:
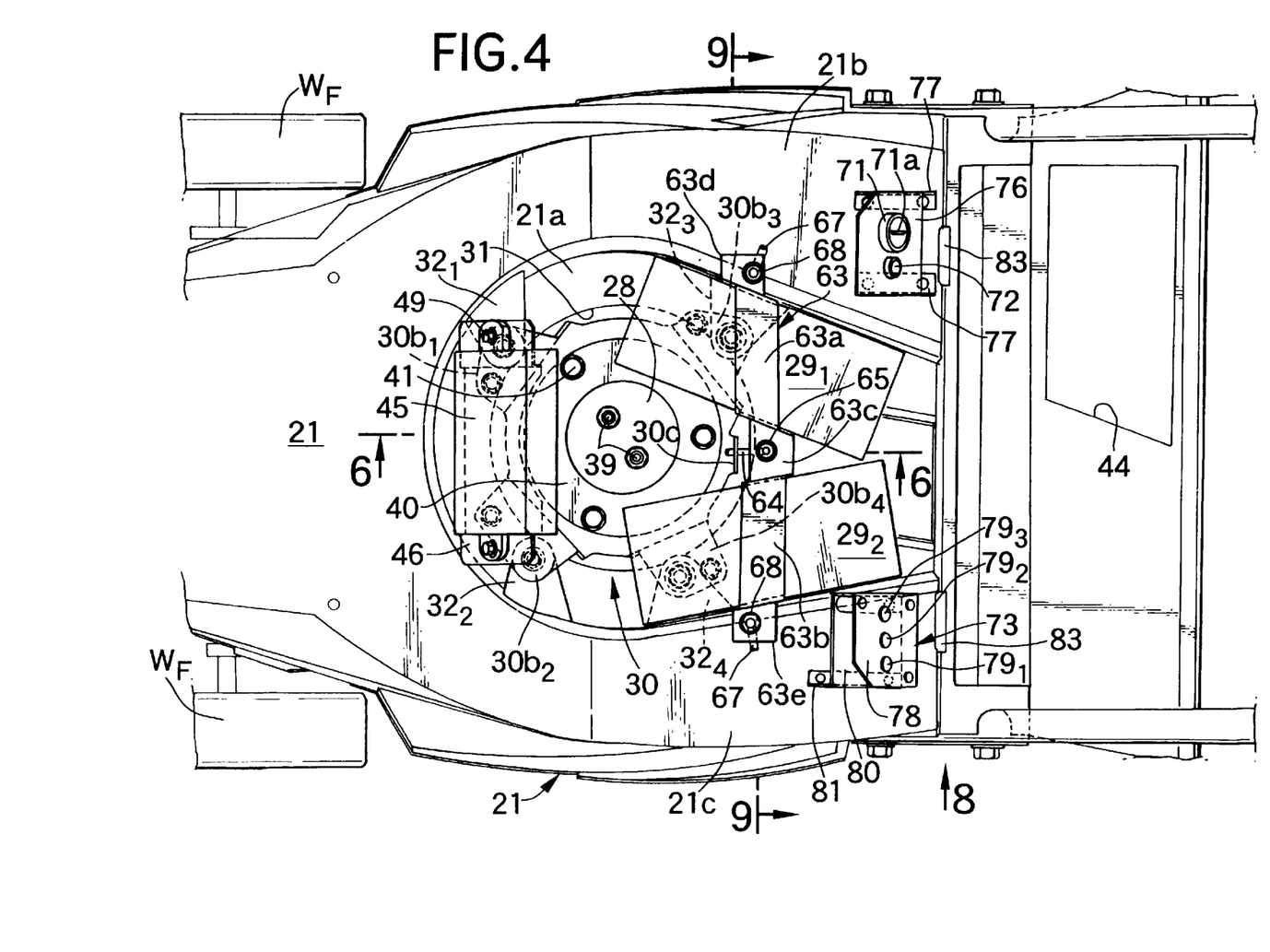
FIG. 4 is a plan view similar to FIG. 3, but in a state in which a housing cover and a discharge port cover have been removed.
Figure 5:
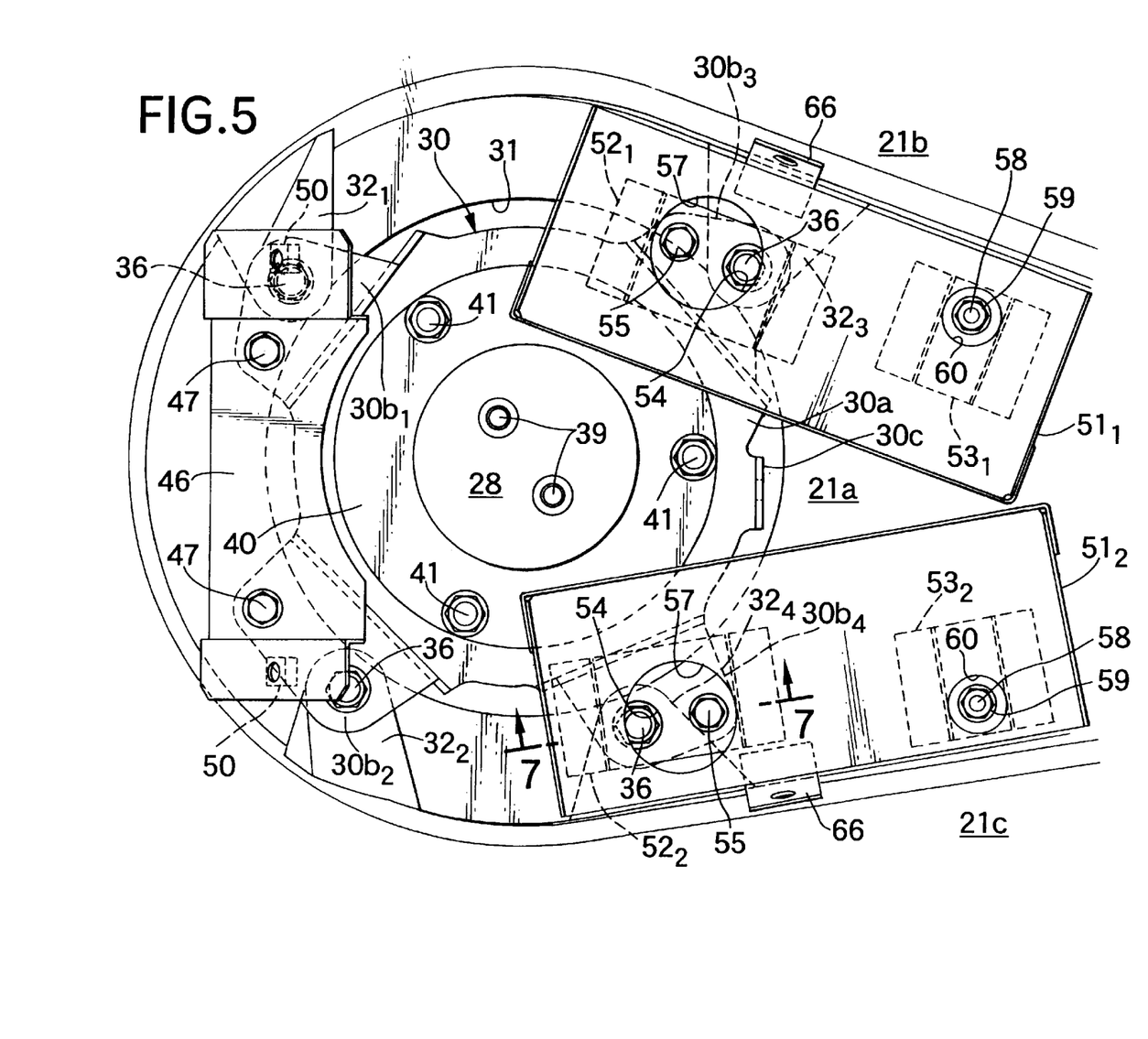
FIG. 5 is an enlarged view of an essential portion shown in FIG. 4 in a state in which the batteries and a control unit have been removed.
Figure 6:
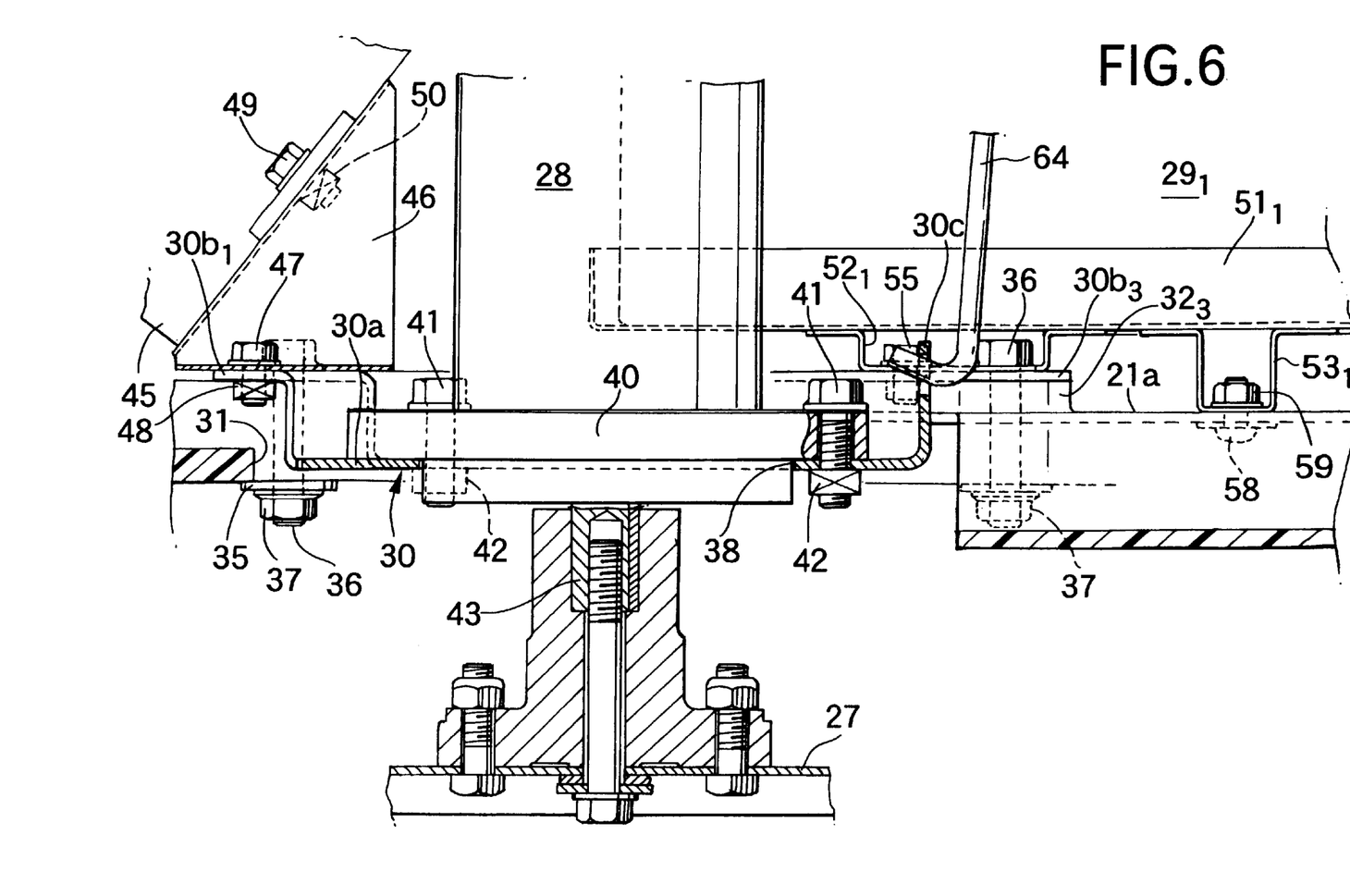
FIG. 6 is an enlarged sectional view taken along line 6—6 in FIG. 4.

Referring also to FIGS. 4, 5 and 6, the cutter housing 21 is provided at its central portion, with a support plate portion 21a which is partially recessed downwards, but formed substantially flat. The electric motor 28 is fixedly supported on the support plate portion 21a through a motor supporting bracket 30.

A circular mounting bore 31 is provided in the support plate portion 21a, and the cutter housing 21 is provided with projecting support portions $32_1$ and $32_2$ which project from the support plate portion 21a, at right and left locations in front of the mounting bore 31, and projecting support portions $32_3$ and $32_4$ which project from the support plate portion 21a at right and left locations, to the rear of the mounting bore 31.

The motor supporting bracket 30 is comprised of a flat plate-like base portion 30a inserted into the mounting bore 31, and mounting plate portions $30b_1$, $30b_2$, $30b_3$ and $30b_4$ connected to the base portion 30a at locations corresponding to the projecting support portions $32_1$, $32_2$, $32_3$ and $32_4$. Each of the mounting plate portions $30b_1$, $30b_2$, $30b_3$ and $30b_4$ is formed into a substantially L-shape in vertical section on corresponding ones of the projecting support portions $32_1$, $32_2$, $32_3$ and $32_4$ to project outwards from the mounting bore 31.

Figure 7:
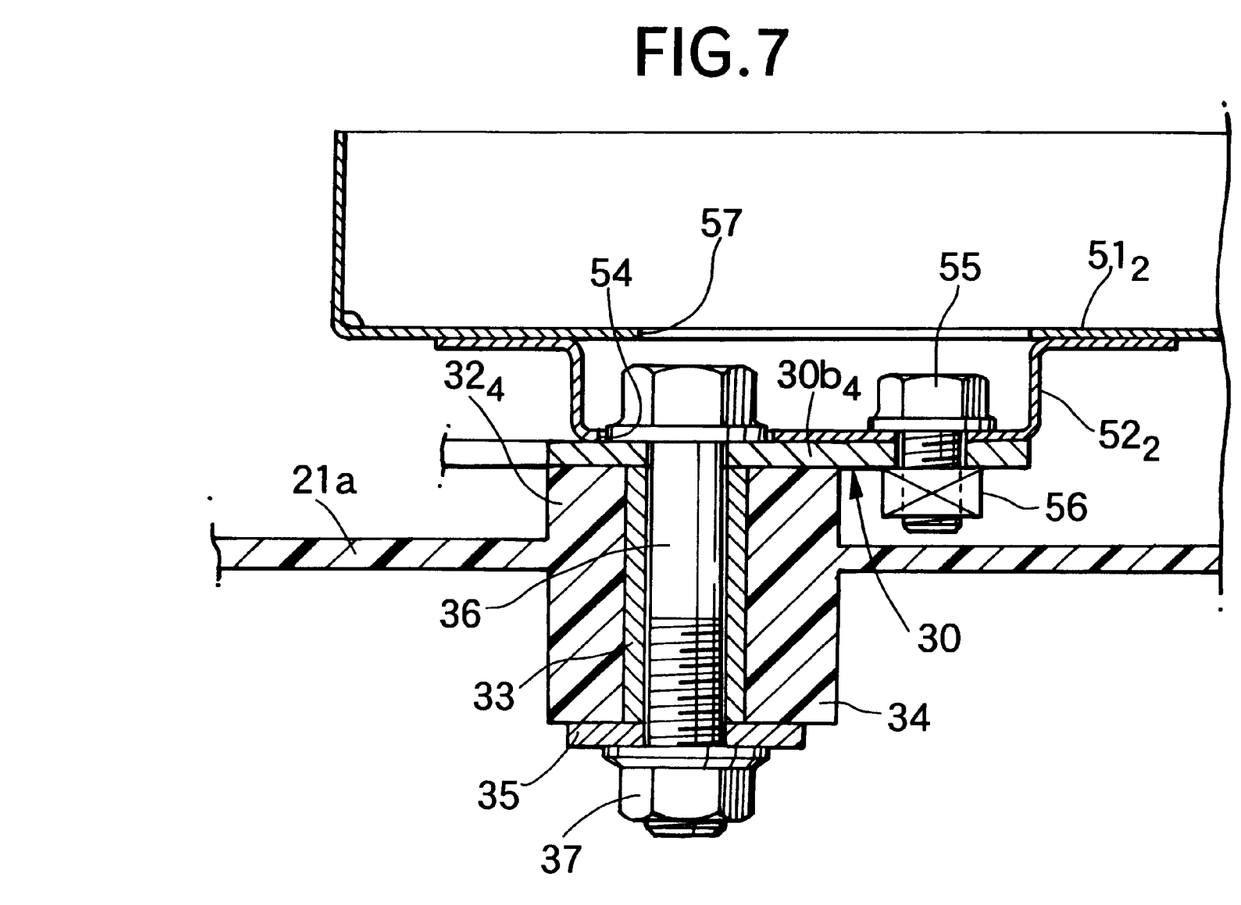
FIG. 7 is an enlarged sectional view taken along line 7—7 in FIG. 6.

Referring also to FIG. 7, the projecting support portions $32_1$, $32_2$, $32_3$ and $32_4$ integral with the support plate portion 21a, are integrally provided with cylindrical boss portions 34, respectively, which extend downwards and into which collars 33 made of a metal, are inserted, respectively. Washers 35 abut against lower end of the collars 33, respectively. Nuts 37 are threadedly fitted over lower ends of bolts 36 which are inserted through the mounting plate portions $30b_1$, $30b_2$, $30b_3$ and $30b_4$, the collars 33 and the washers 35 in a manner such that locking heads at the top ends are engaged with the mounting plate portions $30b_1$, $30b_2$, $30b_3$ and $30b_4$, respectively. The motor supporting bracket 30 is fixed to the supporting plate portion 21a by tightening the nuts 37.

A circular insertion bore 38 is provided in a central portion of the base 30a of the motor supporting bracket 30, and a lower end of the electric motor 28 formed cylindrically and having a pair of connecting terminals 39, 39 at its upper end, is inserted from above into the insertion bore 38. The electric motor 28 is provided at its lower portion with a flange 40 placed on the base 30a at a peripheral edge of the insertion bore 38. The electric motor 28 is fixed onto the motor supporting bracket 30 by bolts 41 which pass through the flange 40 and the base 30a, at a plurality of points, for example, at three points spaced apart from one another circumferentially of the flange 40, into threaded engagement with weld nuts 42 welded to the base 30a.

An output shaft 43 coaxially protrudes from the lower end of the electric motor 28, and the cutter 27 having, for example, a single blade, is coaxially mounted to the output shaft 43.

On the right side with respect to the direction of forward movement of the electric lawn mower M, a discharge port 44 is defined in the rear end of the cutter housing 21, as shown in FIG. 4, so that the grass pieces cut by the cutter 27 are discharged through the discharge port 44.

A scroll portion 21b projects from an outer edge of the support plate portion 21a on the right of the electric motor 28 and is slanted up towards the rear, on the cutter housing 21 to guide the cut grass pieces to the discharge port 44. The scroll portion 21b is formed into a shape such that the scroll portion 21b becomes wider as it becomes closer to the discharge port 44. On the other hand, a projecting slant portion 21c bulges from the outer edge of the support plate portion 21a on the left of the electric motor 28 and is sloped up rearwards on the cutter housing 21 in such a shape that it widens towards the rear. The support plate portion 21a, positioned between the scroll portion 21b and the projecting slant portion 21c, is formed such that its width becomes smaller towards the rear.

A bracket 46 for a unit is fastened to the mounting plate portions $30b_1$ and $30b_2$ of the motor supporting bracket 30 which are disposed in front of the electric motor 28, and a control unit 45 for controlling the operation of the electric motor 28, is fastened onto the unit bracket 46. More specifically, bolts 47 are inserted through the mounting plate portions $30b_1$ and $30b_2$ and the unit bracket 46 at locations offset from the projecting support portions $32_1$ and $32_2$, and the unit bracket 46 is fastened to the mounting plate portions $30b_1$ and $30b_2$ by threadedly fitting the bolts 47 into the weld nuts 48 welded to the lower surfaces of the mounting plate portions $30b_1$ and $30b_2$. The control unit 45 is fastened to opposite sides of the unit bracket 46 by a pair of bolts 49 and weld nuts 50 welded to the lower surface on opposite sides of the unit bracket 46, for threaded engagement of the bolts 49.

Figure 8:
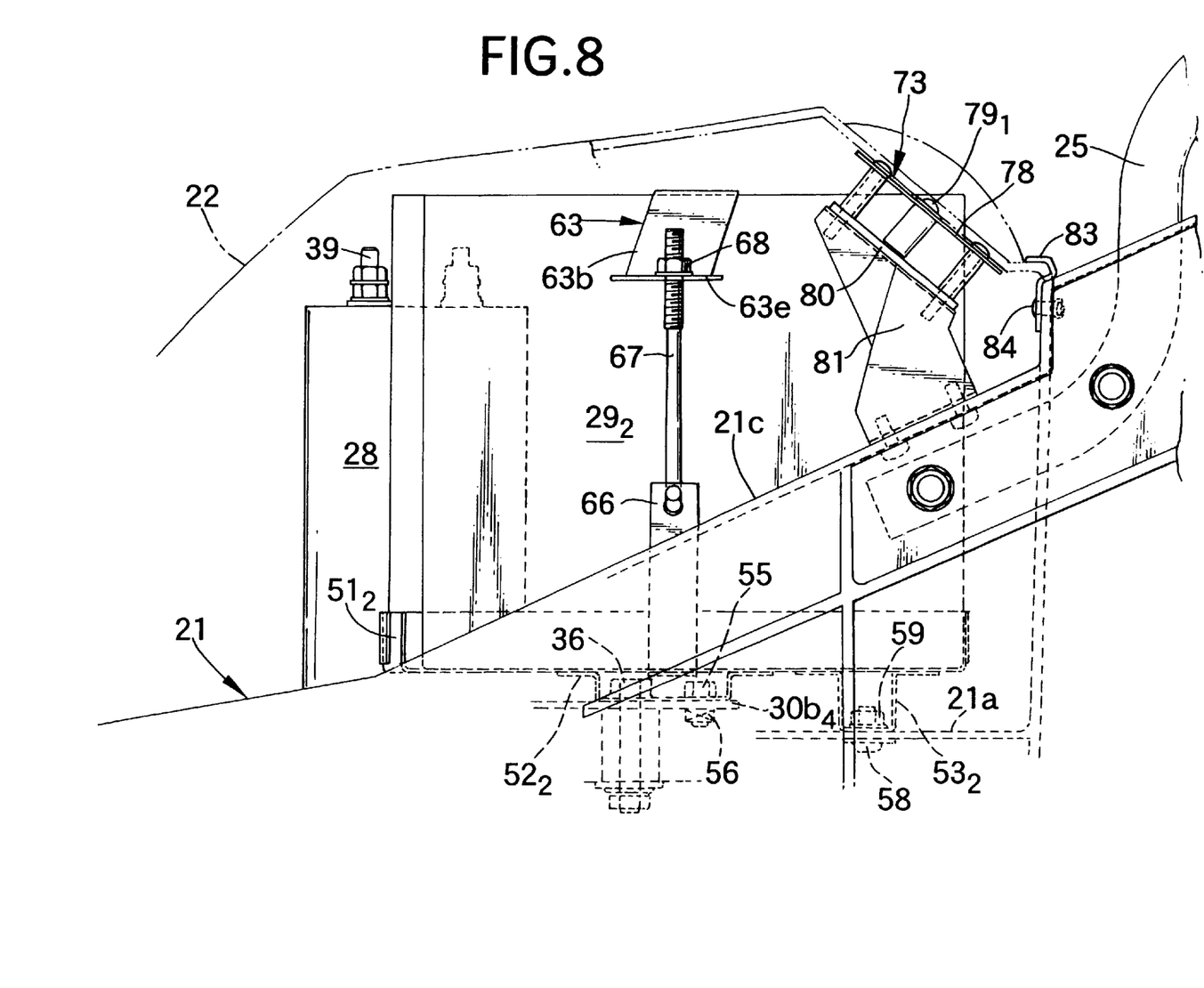
FIG. 8 is an enlarged view taken in the direction of arrow 8 in FIG. 4.
Figure 9:
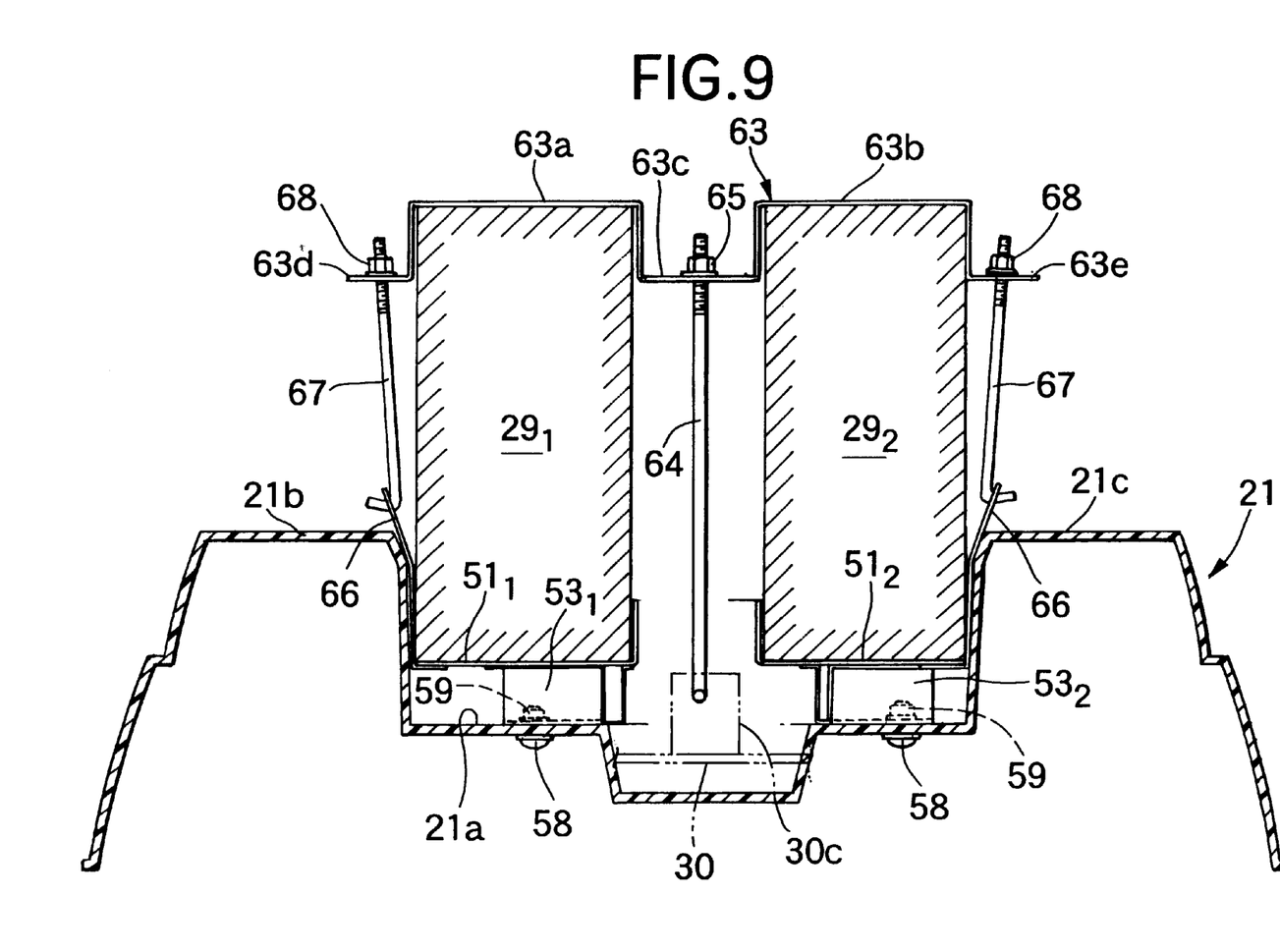
FIG. 9 is a sectional view taken along line 9—9 in FIG. 4.

Referring also to FIGS. 8 and 9, the pair of batteries $29_1$ and $29_2$ are mounted on the support plate portion 21a in an arrangement such that the electric motor 28 is positioned between front ends of the batteries $29_1$ and $29_2$. One $29_1$ of the batteries $29_1$ and $29_2$ extends along the inner side of the scroll portion 21b, while the other battery $29_2$ extends along the inner side of the projecting slant portion 21c, i.e., in an arrangement such that the distance between the rear ends of the batteries $29_1$ and $29_2$ is smaller than the distance between the front ends of the batteries $29_1$ and $29_2$.

The batteries $29_1$ and $29_2$ are fixed onto battery trays $51_1$ and $51_2$. First legs $52_1$ and $52_2$ and second legs $53_1$ and $53_2$ are welded to the bottoms of the battery trays $51_1$ and $51_2$. The first legs $52_1$ and $52_2$ are fastened to the mounting plate portions $30b_3$ and $30b_4$ provided on the motor supporting bracket 30 at the rear of the electric motor 28, and the second legs $53_1$ and $53_2$ are fastened directly onto the support plate portion 21a at the rear of the first legs $52_1$ and $52_2$.

The first legs $52_1$ and $52_2$ are placed on the mounting plate portions $30b_3$ and $30b_4$ and each has a circular bore 54 which is faced by the locking head of the bolt 36 for fastening the mounting plate portions $30b_3$ and $30b_4$ to the projecting support portions $32_3$ and $32_4$. Moreover, bolts 55 are inserted through the first legs $52_1$ and $52_2$ and the mounting plate portions $30b_3$ and $30b_4$ at locations offset from the projecting support portions $32_3$ and $32_4$, and the first legs $52_1$ and $52_2$ are fastened to the mounting plate portions $30b_3$ and $30b_4$ by threadedly inserting the bolts 55 into the weld nuts 56 welded to the lower surfaces of the mounting plate portions $30b_3$ and $30b_4$. The battery trays $51_1$ and $51_2$ are provided at their bottoms with circular operating bores 57 enabling the operation of the bolts 36 and 55.

Bolts 58 pass through the support plate portion 21a from below the support plate portion 21a and are inserted through the second legs $53_1$ and $53_2$ placed on the support plate portion 21a. The second legs $53_1$ and $53_2$ are fastened onto the support plate portion 21a by bringing nuts 59 with the bolts 58 threaded inserted thereinto into engagement with the second legs $53_1$ and $53_2$. Moreover, the battery trays $51_1$ and $51_2$ are provided at their bottoms with circular operating bores 60 enabling the operation of the nuts 59.

A retaining plate 63 is placed onto the batteries $29_1$ and $29_2$ on the battery trays $51_1$ and $51_2$. The retaining plate 63 is formed from a metal sheet and includes a first fitting portion 63a which is formed into a substantially U-shape such that it opens downwards over the upper portion of one of the batteries $29_1$, and a second fitting portion 63b which is formed into a substantially U-shape such that it opens downwards over the upper portion of the other battery $29_2$. A connecting plate portion 63c interconnects the fitting portions 63a and 63b, a first collar portion 63d protrudes outwards from the first fitting portion 63a, and a second collar portion 63e protrudes outwards from the second fitting portion 63b.

An upward-extending locking plate portion 30c is integrally connected to the base 30a of the motor supporting bracket 30 at a location substantially corresponding to the connecting plate portion 63c of the retaining plate 63, and a nut 65 is threadedly fitted over an upper end of a bolt 64 which passes through the connecting plate portion 63c with its lower end engaged with the locking plate portion 30c. Locking plates 66, 66 rising from the sides of the battery trays $51_1$ and $51_2$ to above the scroll portion 21b and the projecting slant portion 21c, are secured to the battery trays $51_1$ and $51_2$ at locations substantially corresponding to the first and second collar portions 63d and 63e of the retaining plate 63. Nuts 68, 68 are threadedly fitted over upper ends of bolts 67, 67 which pass through the collar portions 63d and 63e with their lower ends engaged with the locking plates 66, 66. Thus, the batteries $29_1$ and $29_2$ are fixed on the battery trays $51_1$ and $51_2$ by tightening the nuts 65 and 68, 68.

Figure 10:
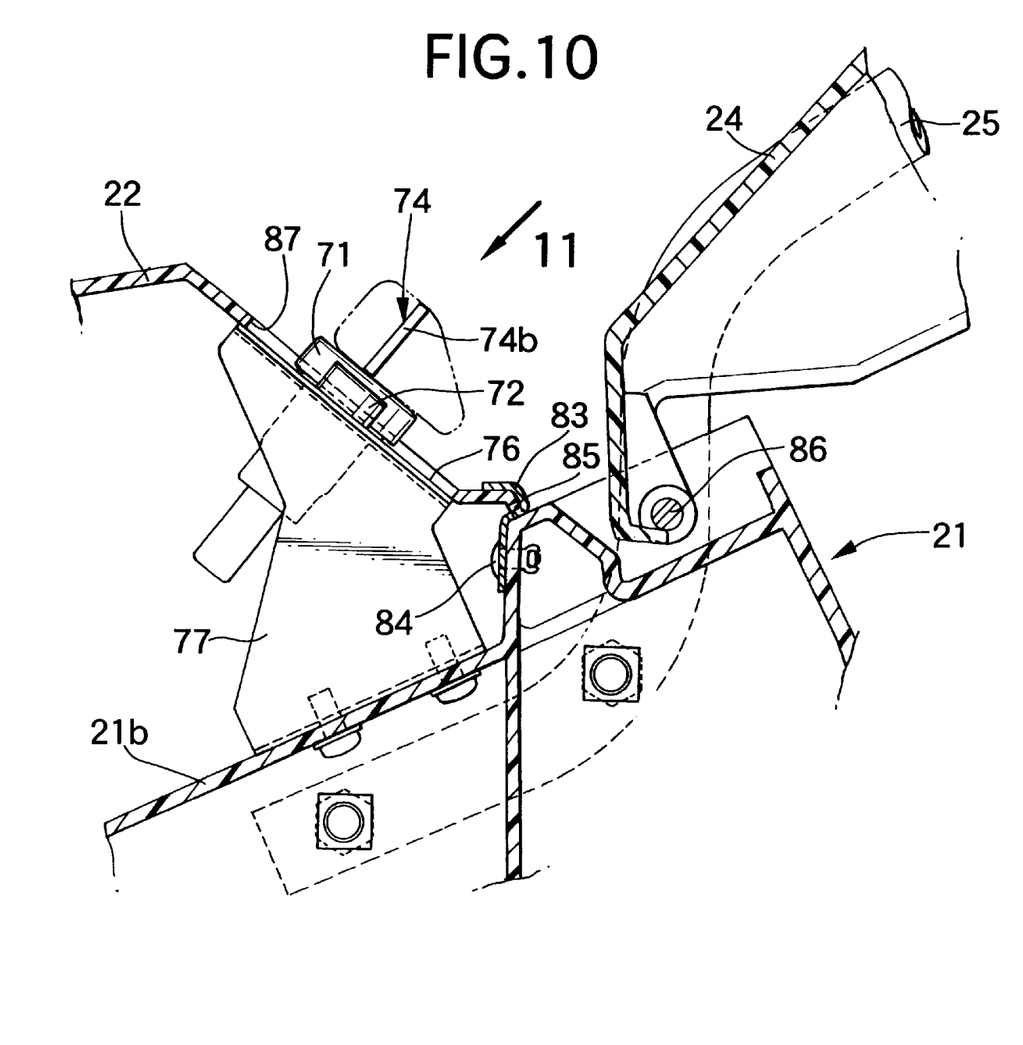
FIG. 10 is an enlarged sectional view taken along line 10—10 in FIG. 3.
Figure 11:
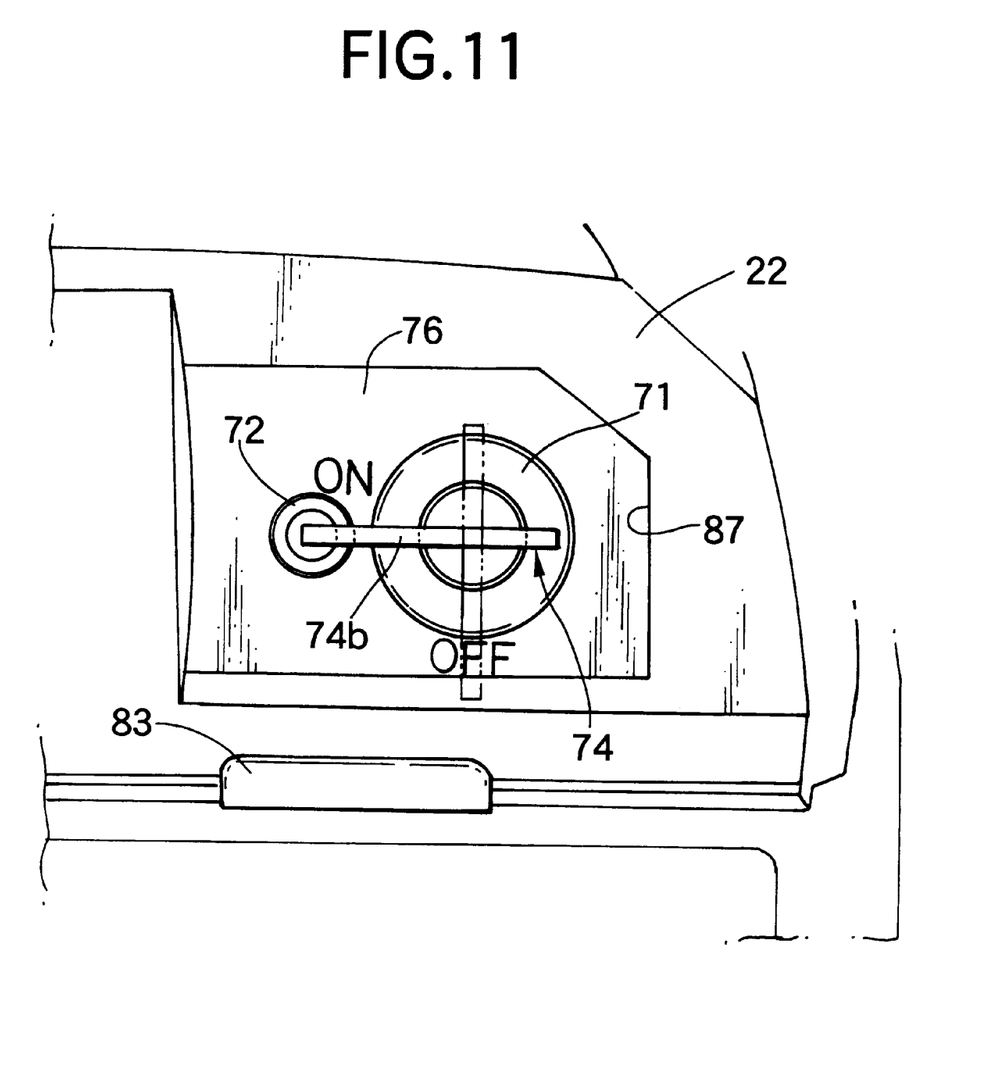
FIG. 11 is a view taken in the direction of arrow 11 in FIG. 10.

Referring to FIGS. 10 and 11, a relatively wide space is provided outside the rear end of each of the batteries $29_1$ and $29_2$ above the cutter housing 21, because the batteries $29_1$ and $29_2$ are disposed at an angle with respect to one another, on the cutter housing 21, so that they are gradually spaced apart from each other in the forward direction. To effectively utilize the space, an electrical switch 71 and a connector 72 are fixedly disposed on the scroll portion 21b outside the rear end of the one battery $29_1$, and an electrical indicator 73 is fixedly disposed on the projecting slant portion 21c outside the rear end of the other battery $29_2$.

The switch 71 is capable of being switched between a first state in which electric power is supplied from the batteries $29_1$ and $29_2$ to the electric motor 28 and a second state in which the electric power is not supplied from the batteries $29_1$ and $29_2$ to the electric motor 28. When the switch 71 is in the first state, the electric power is supplied to the electric motor 28 to drive the cutter 27 by operating an operating switch 75 (see FIG. 1) mounted on a handlebar 26. Moreover, a key hole 71a is provided in one end of the switch 71, so that a key member 74 can be removably inserted into the key hole 71a, only when the switch 71 is in the second state. The switch 71 is switched by turning the key member 74 inserted into the key hole 71a, for example, through 90 degrees. The connector 72 is of a female type, for connection to a male-type connector mounted at a tip end of a connecting cord for supplying charging electric power from an external power source to the batteries $29_1$ and $29_2$.

Figure 12:
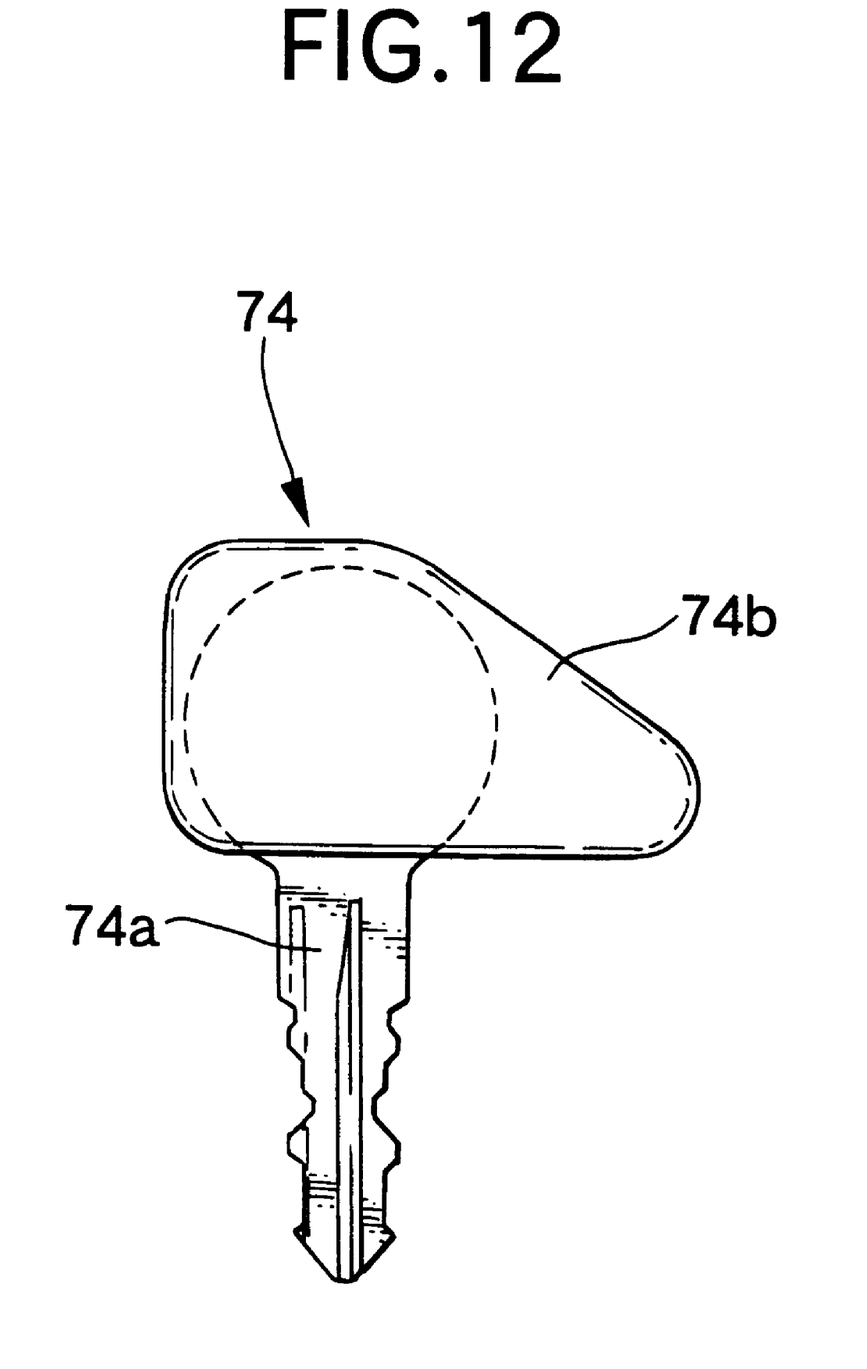
FIG. 12 is a side view of a key member.

Referring to FIG. 12, the key member 74 includes a key body 74a having one end for insertion into the key hole 71a, and an operating portion 74b integrally or detachably provided at the other end of the key body 74a. The operating portion 74b is formed into such a shape that it protrudes outwards from the key body 74a.

A pair of brackets 77 are fastened to the upper surface of the scroll portion 21b, and the switch 71 is fixed to a support plate 76 fixed on the brackets 77, so that one end thereof protrudes from the support plate 76. As clearly shown in FIG. 11, an "ON" position and an "OFF" position are indicated on the support plate 76 at two points spaced apart at approximately 90 degrees from each other around the switch 71. When the operating portion 74a of the key member 74 inserted into the key hole 71a is in the "ON" position, the switch 71 assumes the first state in which electric power can be supplied from the batteries $29_1$ and $29_2$ to the electric motor 28, and when the operating portion 74a is in the "OFF" state, the switch 71 assumes the second state in which the electric power cannot be supplied from the batteries $29_1$ and $29_2$ to the electric motor 28.

The connector 72 is fixed at a position corresponding to the "ON" position, to the support plate 76 in proximity to the switch 71. When the key member 74 is turned so that the operating portion 74b thereof assumes the "ON" position in order to bring the switch 71 into the first state, the connector 72 is covered with the operating portion 74b, so that the external power source cannot be connected to the connector 72.

An indicator 73 includes a first base plate 78, first, second and third indicating lamps $79_1$, $79_2$ and $79_3$, such as luminescent diodes mounted in a line on the first base plate 78, and a second base plate 80 disposed below the first base plate 78. The indicator 73 is fixed onto a bracket 81 fastened onto the projecting slant portion 21c. Drive circuits and the like (not shown) for the indicating lamps $79_1$, $79_2$ and $79_3$ are carried on the second base plate 80, so that the indicating lamps $79_1$, $79_2$ and $79_3$, are turned on depending upon the remaining capacity of the batteries $29_1$ and $29_2$. Moreover, the first and second indicating lamps $79_1$ and $79_2$ are green, and the third indicating lamp $79_3$ is red. When the batteries $29_1$ and $29_2$ are in their fully charged states, the first and second green indicating lamps $79_1$ and $79_2$ are turned on, and when the batteries $29_1$ and $29_2$ reach their semi-charged states, the first indicating lamp $79_1$ is turned off, while the second indicating lamp $79_2$ remains turned on. Further, when the charging of the batteries $29_1$ and $29_2$ is required, the first and second green indicating lamps $79_1$ and $79_2$ are turned off, while the third red indicating lamp $79_3$ is turned on.

The remaining capacity of the batteries $29_1$ and $29_2$ is clearly indicated by changing of the on-off modes of the indicating lamps $79_1$, $79_2$ and $79_3$ in accordance with the remaining capacity of the batteries $29_1$ and $29_2$, in the above manner. When the charging of the batteries $29_1$ and $29_2$ is required, a driver is thus notified about such charging. Thus, the life of the batteries $29_1$ and $29_2$ can be prolonged.

Figure 13:
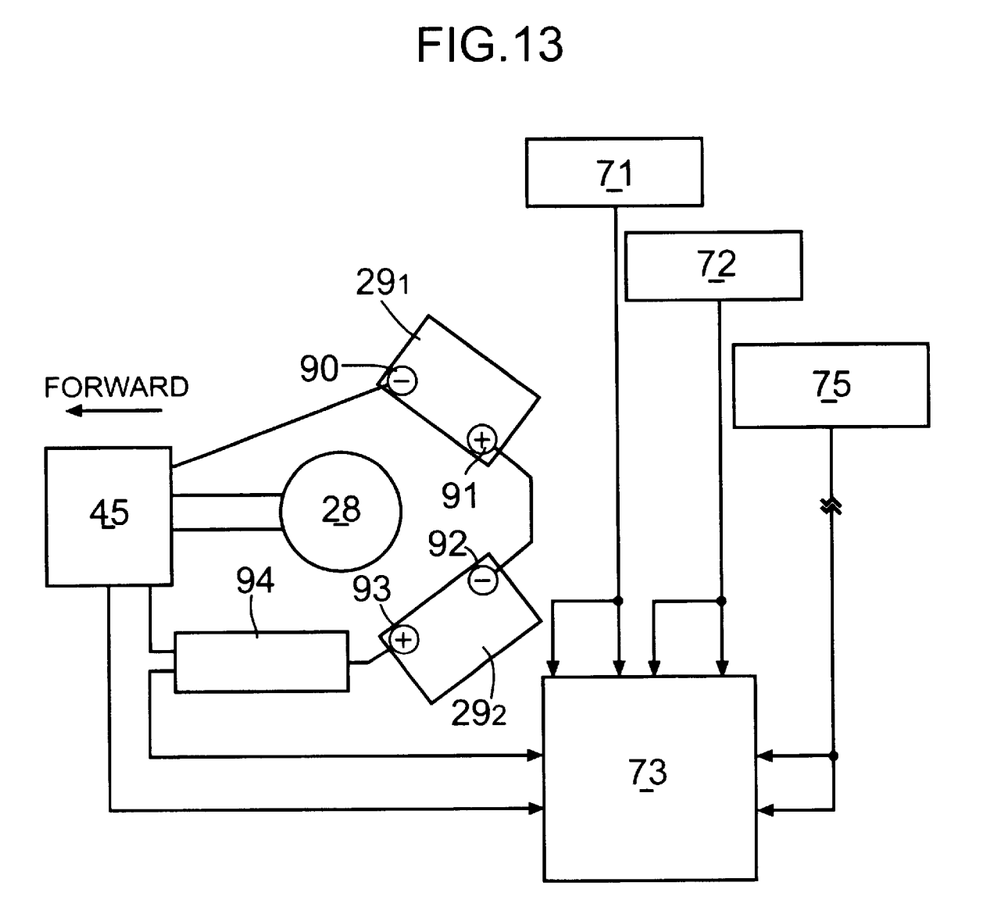
FIG. 13 is a diagram showing the state in which an electric motor, the control unit, the batteries and electric equipment have been electrically connected to one another.

The electric motor 28, the batteries $29_1$ and $29_2$, the control unit 45, the switch 71, the connector 72 and the indicator 73 are disposed on the cutter housing 21 in an arrangement as shown in FIG. 13. One of the batteries $29_1$ and $29_2$ is disposed on the right of the electric motor 28 with its negative terminal 90 located at the front and its plus terminal 91 located at the rear. The other battery $29_2$ is disposed to the left of the electric motor 28 with its negative terminal 92 located at the rear and its plus terminal 93 located at the front. Therefore, the electric connection between the control unit 45 disposed in front of the electric motor 28 and connected to the electric motor 28 through a pair of cables and the batteries $29_1$ and $29_2$ connected in series, is achieved by sequentially connecting the control unit 45 to the negative terminal 90 of the one battery $29_1$, the plus terminal 91 of the one battery $29_1$ to the negative terminal 92 of the other battery $29_2$, and the plus terminal 93 of the other battery $29_2$ to the control unit 45 in one direction around the electric motor 28. Thus, the connecting wiring between the control unit 45 and the batteries $29_1$ and $29_2$ can be simplified. A fuse 94 is mounted between the plus terminal 93 of the other battery $29_2$ and the control unit 45.

The control unit 45 and the indicator 73 are connected to each other, for example, through a 6-core flat cable, and the switch 71, the connector 72 and the operating switch 75 are also connected to the indicator 73.

The housing cover 22 is mounted on the cutter housing 21, so that it covers the electric motor 28, the batteries $29_1$ and $29_2$, and the control unit 45 which are mounted on the cutter housing 21. The switch 71, the connector 72 and the first, second and third indicating lamps $79_1$, $79_2$ and $79_3$ are exposed to the outside. The housing cover 22 is fastened at its front portion to the cutter housing 21 by a pair of threaded members 82, 82 (see FIG. 1). Engage members 83 are secured to the rear portion of the cutter housing 21 by clips 84 at two points spaced apart from each other in the widthwise direction of the cutter housing 21, and the rear portion of the housing cover 22 is resiliently engaged with the engage members 83. Moreover, notches 85 are provided at the rear end of the housing cover 22, as shown in FIG. 10, and the engage members 83 are fitted into the notches 85. Thus, the looseness of the housing cover 22 in the widthwise direction of the cutter housing 21 is inhibited by the fitting of the engage members 83 into the notches 85.

An opening 87 for outside exposure of the switch 71 and the connector 72, is provided in the rear portion of the housing cover 22, so that it is closed by the support plate 76, and an opening 88 for outside exposure of the first, second and third indicating lamps $79_1$, $79_2$ and $79_3$, is also provided in the rear portion of the housing cover 22, so that it is closed by the first base plate 78.

The discharge port cover 24 is turnably supported at its front end on the rear end of the cutter housing 21 through a support shaft 86, and is swingable between an opened position (a position shown in FIG. 1) in which it has been swung upwards and retained above the grass bag 23, and a closed position in which when the grass bag 23 has been removed, the discharge port cover 24 covers the discharge port 44 in the cutter housing 21, and the lower end of the discharge port cover 24 serves as a discharge bore.

The operation of this embodiment will be described below. By the fact that the batteries $29_1$ and $29_2$ are mounted on the cutter housing 21 in such a manner that the front ends thereof are disposed on the opposite sides of the electric motor 28, the lateral weight balance of the cutter housing 21 as a result of the mounting of the batteries $29_1$ and $29_2$ can be substantially uniform, thereby enhancing the travelability of the electric lawn mower M. Moreover, the longitudinal length of the space above the cutter housing 21, in rear of the electric motor 28, for mounting of the batteries $29_1$ and $29_2$ can be relatively shortened, whereby the longitudinal length of the cutter housing 21 can be relatively short. In addition, since the electric motor 28 is connected directly to the cutter 27, a space for the power transmitting means between the electric motor 28 and the cutter 27, is not required above the cutter housing 21 and hence, the cutter housing 21 can be more compact because the longitudinal lengths can be shortened.

One of the batteries $29_1$ and $29_2$ is disposed along the inner side of the scroll portion 21b which is widened as it becomes closer to the discharge port 44, and the area of the discharge port 44 cannot be narrowed due to the mounting of the pair of batteries $29_1$ and $29_2$. In addition, since the batteries $29_1$ and $29_2$ are mounted on the support plate portion 21a lying at a relatively low level, they can be mounted at a relatively low location on the cutter housing 21 to thus lower the center of gravity of the traveling section including the cutter housing 21 and to maintain the height of the traveling section at a relatively low level.

Additionally, by the fact that the batteries $29_1$ and $29_2$ are disposed with the distance between their front ends being larger than the distance between their rear ends, a relatively wide space is provided above the cutter housing 21 outside the rear ends of the batteries $29_1$ and $29_2$. As a result, the switch 71, the connector 72 and the indicator 73 can be fixedly mounted to the outside of the rear ends of the batteries $29_1$ and $29_2$, and disposed effectively utilizing the space without increasing of the width of the cutter housing 21.

Moreover, one of the batteries $29_1$ and $29_2$ is disposed on the left or right of the electric motor 28 with its negative terminal 90 located at the front and its plus terminal 91 located at the rear, while the other battery $29_2$ is disposed on the other of the left or right of the electric motor 28 with its negative terminal 92 located at the rear and its positive terminal 93 located at the front. Therefore, the electric connection between the batteries $29_1$ and $29_2$ connected in series and the control unit 45 is achieved by sequentially connecting the batteries $29_1$ and $29_2$ and the control unit 45 in one direction around the electric motor 28. Thus, the connecting wiring between the control unit 45 and the batteries $29_1$ and $29_2$ can be simplified.

The key member 74 for switching the switch 71 is comprised of the key body 74a having one end for insertion and removal from the key hole 71*a* in the switch 71. The operating portion 74*b* is integrally or removably provided at the other end of the key body 74*a* to protrude sideways from the key body 74*a*. When the key member 74 has been operated to the "ON" position, the connector 72 is covered with the operating portion 74*b* of the key member 74, so that it cannot be connected to the external power source. Therefore, the switch 71 can be switched between the state in which the electric power can be supplied to the electric motor 28 and the batteries 29$_1$ and 29$_2$ cannot be charged, and the state in which the electric power cannot be supplied to the electric motor 28 and the batteries 29$_1$ and 29$_2$ can be charged, by the simple operation of only turning the key member 74 inserted in the switch 71.

Although the present invention has been described as being applied to the electric lawn mower M in the preferred embodiment, the present invention is widely applicable to electric working machines including an electric motor for driving an operating member, and a battery for supplying an electric power to the electric motor.

Although the present invention has been described in detail, it will be understood that the present invention is not limited to the above-described embodiment, and various modifications in design may be made without departing from the spirit and scope of the invention defined in claims.

What is claimed is:

1. A lawn maintenance apparatus comprising:

(a) a housing;

(b) an electric motor for driving an operating member mounted on said housing;

(c) at least one battery mounted on said housing, for supplying electric power to said electric motor;

(d) rotatable, key-operated, switch electrically connected between said at least one battery and said motor for rotatably switching between a first state in which electric power is supplied from said at least one battery to said electric motor and a second state in which electric power is not supplied from said at least one battery to said electric motor;

(e) a key member for insertion into and removal from said rotatable switch only when said rotatable switch is in the second state, for switching said rotatable switch; and (f) a connector for connecting an external power source for charging said at least one battery;

wherein said key member comprises a key body having one end for insertion into said rotatable switch and an operating portion at the other end of said key body extending laterally from said key body and wherein said connector is positioned to the side of said rotatable switch at a location where said connector is covered by the operating portion of said key member when the position of said key member in said rotatable switch corresponds to the first state, whereby the connection of said connector with the external power source is blocked by said operating portion.

2. A lawn maintenance apparatus as set forth in claim 1, wherein said at least one battery is at least two batteries.

3. A lawn maintenance apparatus as set forth in claim 2, wherein said batteries are positioned at an angle with respect to one another, with a distance between the batteries being larger towards the front of the machine.

4. A lawn maintenance apparatus as set forth in claim 1, wherein said operating portion of said key is integral with said key body.

5. A lawn maintenance apparatus as set forth in claim 1, wherein said operating portion of said key is removably fixed to said key body.

6. A lawn maintenance apparatus as set forth in claim 1, further comprising a housing cover mounted on said housing, said housing cover having an opening providing external access to said rotatable, key-operated switch when said housing cover is in its mounted position.

* * * * *